(12) United States Patent
Evans et al.

(10) Patent No.: US 6,843,565 B2
(45) Date of Patent: Jan. 18, 2005

(54) LASER PROJECTION SYSTEM TO FACILITATE LAYUP OF COMPLEX COMPOSITE SHAPES

(75) Inventors: Charles R. Evans, Cincinnati, OH (US); Jack W. Baldwin, Westchester, OH (US); Scott A Welsh, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 10/211,132

(22) Filed: Aug. 2, 2002

(65) Prior Publication Data

US 2004/0021828 A1 Feb. 5, 2004

(51) Int. Cl.[7] .............................. G03B 21/26; F01D 5/14
(52) U.S. Cl. ........................ 353/28; 416/224; 416/230
(58) Field of Search .......................... 353/28, 121, 122; 416/224, 230

(56) References Cited

U.S. PATENT DOCUMENTS

| | | |
|---|---|---|
| 5,250,136 A | 10/1993 | O'Connor |
| 5,375,978 A | 12/1994 | Evans et al. |
| 5,506,641 A | 4/1996 | Dorsey-Palmateer |
| 5,594,652 A | 1/1997 | Penn et al. |
| 5,989,397 A | 11/1999 | Laube et al. |
| 6,000,801 A | 12/1999 | Dillon et al. |
| 6,007,319 A | 12/1999 | Jacobson |
| 6,041,132 A * | 3/2000 | Isaacs et al. ................ 382/100 |
| 6,045,651 A | 4/2000 | Kline et al. |
| 6,051,113 A | 4/2000 | Moslehi |
| 6,066,285 A | 5/2000 | Kumar |
| 6,092,002 A | 7/2000 | Kastman et al. |
| 6,172,996 B1 | 1/2001 | Partanen et al. |
| 6,180,049 B1 | 1/2001 | Jang et al. |
| 6,193,923 B1 | 2/2001 | Leyden et al. |

* cited by examiner

Primary Examiner—Russell Adams
Assistant Examiner—Arthur A Smith
(74) Attorney, Agent, or Firm—Carmen Santa Maria; McNees Wallace & Nurick LLC

(57) ABSTRACT

The present invention provides a process for the lay-up of a composite laminate article, the article produced by this process, and the apparatus used to produce the composite laminate article. The composite laminate article may be, for example, an airfoil, particularly useful as a fan blade in a large high bypass ratio turbofan engine, wherein the blade is generally regarded as large and having a high degree of twist. In a preferred embodiment, the present invention provides a process for laying up a composite laminate article comprising a) reading a data set to enable the projection of an image of a ply section onto a work surface, the image indicating a ply section target point; b) laying up a ply section of composite laminating material within the image, wherein the ply section first contacts the work surface at the target point; and c) repeating steps (a)–(b) until the composite laminate article is complete. In a second preferred embodiment, the present invention provides for a lamination apparatus for use in making a composite laminate article comprising a work surface for receiving, in a predetermined sequence, a plurality of ply sections of composite laminating material; a laser projection system using predetermined projection points for outlining an image of a ply section onto the work surface, the image further indicating a ply section target point for making first contact of the ply section with the work surface; and a data set for providing the predetermined projection points to the laser projection system.

14 Claims, 5 Drawing Sheets

LASER PROJECTION SYSTEM TO FACILITATE LAYUP OF COMPLEX COMPOSITE SHAPES

FIELD OF THE INVENTION

This invention relates to composite airfoils and their manufacture and more particularly to a composite fan blade having unidirectional fiber laminates arranged by utilizing a rapidly-scanned laser system to project a precise image onto a precisely located region of a work surface, the image including a start indicator for precisely locating a first point of contact for lay-up of each laminate or prepreg.

BACKGROUND OF THE INVENTION

In recent years, the relatively heavy metal blades and vanes of fluid flow machines such as gas turbine engine fans and compressors have been replaced with lighter composite materials. These composite blades and vanes are fabricated to have high strength, and are made from plies comprising elongated fibers in a light weight matrix.

Over the years the term composite has had several meanings regarding the use of two or more materials having different properties. In the aerospace industry, the term composite has come to be defined as a material containing a reinforcement such as fibers or particles supported in a binder or matrix material. The composite blades and airfoils of the present invention are preferably of the non-metallic type made of a material containing a fiber such as a carbonaceous, silica, metal, metal oxide, or ceramic fiber embedded in a resin material such as epoxy, PMR-15, BMI, PEEK, etc. Of particular use are unidirectional fiber-reinforced prepreg composite sheets, laid up in a predetermined sequence and formed into a part shape, and cured via an autoclaving process or press molding to form a light weight, stiff, relatively homogeneous article having laminates within.

Many types of foreign objects may be entrained in the inlet of a gas turbine engine, ranging from large birds, such as sea gulls, to hailstones, sand and rain. Damage from foreign objects, referred to as foreign object damage (FOD), takes two forms. Smaller objects can erode the blade material and degrade the performance of the fan and engine. Impact by larger objects may fracture or pierce the blades. Portions of an impacted blade can be torn loose and cause extensive secondary damage to the downstream blades and other engine components.

In this regard, the consequences of foreign object damage are greatest in the low pressure compressors and fans of high bypass gas turbine engines. However, these components offer the greatest potential in weight reduction due to their size. For example, tip diameters on fan blades of high thrust jet engines are as great as ten feet, and have spans in the order of two or more feet. Many developments have been made to prevent composite fan blade failures such as a metallic leading edge protection strip which also helps provide erosion protection for the fan blade.

One particular FOD-related failure mode of composite fan blades is bending and delamination of the blade when it is struck by a heavy object such as a bird, particularly in a region near the radially outward blade tip. This, in turn, can result in secondary engine damage as the blade fragments, including the leading edge protection strip, are ingested through the engine.

Thus, it has become highly desirable to develop light weight composite blades. Of particular importance are long span fan blades made of light weight non-metallic materials for a high bypass ratio gas turbine engines which resist delamination due to bending induced by foreign object impact into the blade.

One such light weight composite fan blade is set forth in U.S. Pat. No. 5,375,978. This patent sets forth sequencing of plies to provide a large composite airfoil having a high degree of twist. Groups of plies are arranged in order by span height, shortest to tallest starting at the centerplane. Each group of plies has four laminations arranged in an angular sequence of 0°, +Φ, 0°, −Φ° where Φ° is a predetermined angle measured from 0°. The progression of the groups is broken by at least one group of relatively tall laminations. The groups also may be arranged so that no two adjacent groups are in order of span height progression. The result is a light weight blade with a high degree of twist laid up generally along the centerplane so that a shear plane is not created where radially outer edges of the laminations end.

One development to prevent delamination is fabricating a fan or compressor blade by laying up and bonding together a plurality of unidirectional prepreg plies. Ideally, the unidirectional fibers of at least a portion of the plies are skewed, in a chordwise direction, forward and aft of a non-radial blade axis, thus forming a biased lay-up with the blade center of twist biased forward or aft of the blade radial axis. This significantly increases the torsional frequency of the blade.

It is well known that the blade includes a root section, where the blade is attached to a rotating disk, and an airfoil section extending into the air flow path. The number of plies may run on the order of one thousand in the root area of the blade. Ply thickness is usually determined by the material to be used and is on the order of 4–6 mils per ply. The span height, width, and shape depends, at least in part, on the shape and contour of the blade. Typically, three-dimensional computer aided design (CAD) systems are used to design ply shapes and span heights. The CAD system also determines, based on pre-determined criteria, the precise order of lay-up of the plies to achieve the final part form while maintaining optimum strength characteristics.

To achieve desired strength characteristics, the fibers within each ply should remain unidirectional. The long spans and high degrees of twist characteristic of aerodynamic blades in modern high bypass ratio turbofan engines do not allow for a single piece of material to be used in each ply and still maintain fibers which are unidirectional within the ply. Because of complex airfoil geometries, the CAD system may design a lay-up comprising a plurality of ply sections laid up adjacent to one another to form a single ply layer.

Many of these complex geometric parts require hand-lay-up. In order for the finished part to maintain the close tolerances required by the complex geometries, it is critical that each ply section be placed precisely in its CAD system predetermined location during the hand-lay-up process. To aid in this precise placement, laser projection systems, often referred to as an "Optical Lay-up Template" (OLT) utilize 3-D data sets calculated by the CAD system to accurately identify placement locations on a work surface, for example, a lay-up tool or a ply layer. These rapidly scanning laser systems move a laser beam from location to location with sufficient speed to appear as a continuous line. A plurality of lines are used to precisely define the borders in which to place the ply section. The exact sequence of ply section placement, as determined by the CAD system is programmed into the OLT.

One problem encountered is that a prepreg ply section can be deformed during hand lay-up. While a unidirectional prepreg ply section is resistant to distortion along the fiber axis, it can be easily distorted by forces directed at an angle to the fiber axis, particularly when directed 90 degrees to the fiber axis. Such transverse distortion forces inadvertently applied during the hand lay-up process may "stretch" the ply, causing the laid-up ply section to extend beyond one or more of the predetermined CAD system borders, adversely affecting final part form and/or creating non-unidirectional fiber patterns, thereby adversely affecting final part strength.

The present invention provides a method to reduce or eliminate distorted ply sections inadvertently produced during the hand lay-up process and provides other related advantages.

SUMMARY OF THE INVENTION

The present invention provides a process for the lay-up of a composite laminate article, the article produced by this process, and the apparatus used to produce the composite laminate article. The composite laminate article may be, for example, an airfoil, particularly useful as a fan blade in a large high bypass ratio turbofan engine, wherein the blade is generally regarded as large and having a high degree of twist.

In a preferred embodiment, the present invention provides a process for laying up a composite laminate article comprising: (a) providing a plurality of plies; (b) reading a data set stored in a memory device indicative of a preselected image of a ply at a preselected location of the article; (c) projecting an image of the ply at the preselected location of the article onto a work surface, the image further including a ply target point; (d) selecting a ply from the plurality of plies corresponding to the projected image of the ply at the preselected location of the article (e) laying up the ply of composite material within the projected image, wherein the ply first contacts the target point; and c) repeating steps (a)–(e) until the composite laminate article is completely laid up.

In a second preferred embodiment, the present invention provides for a lamination apparatus for use in making a composite laminate article comprising a work surface for receiving, in a predetermined sequence, a plurality of plies of composite laminating material; a laser projection system projecting predetermined projection points in the predetermined sequence onto the work surface outlining an image of a ply at a preselected location of the article, the image further indicating a ply target point for making first contact of the ply with the work surface; and a data set for providing the predetermined projection points in the predetermined sequence to the laser projection system.

Among the advantages provided by the present invention is increased ply lay-up speed and increased ply lay-up accuracy, with decreased incidence of scrapping material, during manufacture of a light weight composite blade. The blade is highly resistant to delamination and failure caused by bending and impact from FOD such as debris and bird ingestion, so accurate ply lay-up is important in maintaining the structural integrity of the ply.

Another advantage of this invention is that the apparatus and method of the present invention enhances the design and capabilities of light weight blades, particularly for long blades with a high degree of twist, as are found in large diameter fans on high bypass ratio turbofan gas turbine engines.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
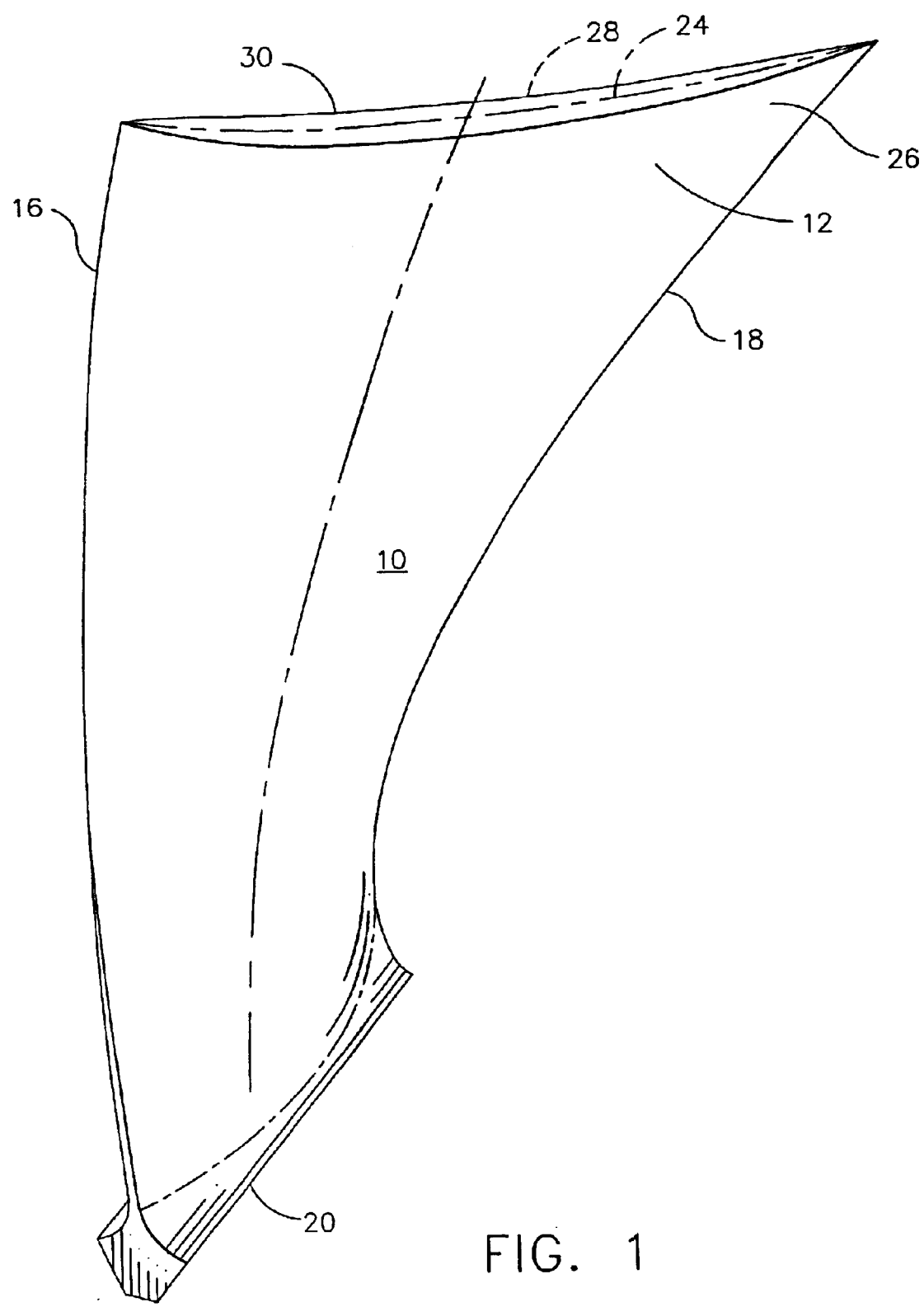
FIG. 1 is a perspective view of a typical turbofan engine composite fan blade.

Illustrated in FIG. 1 is a composite fan blade 10 for a high bypass ratio fanjet gas turbine engine having a composite airfoil portion 12 typically including a leading edge 16 and a trailing edge 18. Composite airfoil portion 12 extends radially outward from a root portion 20 to an extent generally defining its span and includes a centerplane 24 that generally divides airfoil portion 12 into two parts that culminate in the convex side 26 and the concave side 28 of the airfoil portion 12 of the blade 10. Composite blade 10 is made up of fiber reinforced laminations 30 formed from a composite material lay-up generally indicated at 36, in FIG. 2, of fiber reinforced prepreg plies 30. As used herein, the terms "lamination" and "ply" are synonymous and the term "prepreg" is used in the art to describe the laminations of fibers impregnated with a matrix of uncured or partially cured resin. The airfoil plies 40 are essentially those individual plies that extend outward to form the airfoil portion 12 of blade 10 in FIG. 1. Between airfoil plies 40 are inserts 41 that are often characterized as root plies that are used to help form the thicker root portion of the blade, but, since they do not extend a radially outward a substantial distance, not the airfoil portion.

Figure 3:
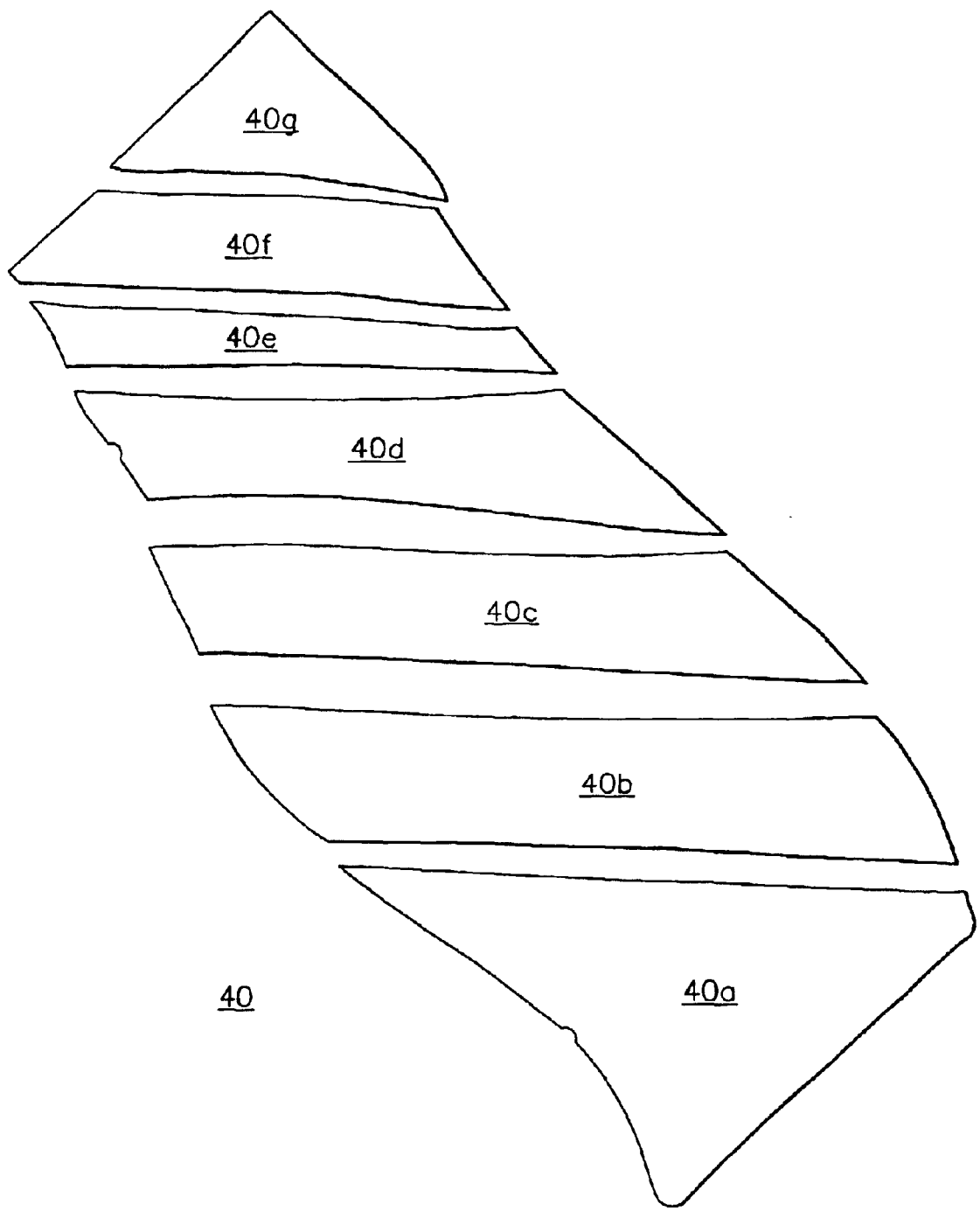
FIG. 3 is an exploded perspective view of ply sections comprising a ply layer in accordance with one embodiment of the present invention.

As shown in FIG. 3, in order to maintain unidirectional integrity of the prepreg fibers, each airfoil ply 40 may be assembled from a plurality of ply sections 40a–40g. The ply sections 40a–40g, are generally all made from a unidirectional fiber ply material, or prepreg, to form an airfoil ply 40, and a plurality of airfoil plies 40 is used to form the composite airfoil portion 12 when assembled together as shown in FIG. 1.

The shape, size, and order of placement of ply sections 40a–40g used during hand lay-up of the blade 10 is predetermined by a Computer-Aided Design ("CAD") system (not shown) using predetermined design criteria, well known in the art. The lay-up described above results in a composite airfoil that has a progression of airfoil prepreg plies 40 of varying span, arranged in order as determined by the CAD system (more fully described below).

The inserts 41 may be distinguished from the airfoil plies 40 by size, wherein the inserts extend essentially only through the area of the root and are substantially shorter than the airfoil plies 40. Inserts 41 are used to produce the extremely thick root (as compared to the airfoil portion)

portion which ultimately provide the proper dovetail root configuration. The inserts 41 are preferably interspersed among all the airfoil plies 40. The inserts 41 are of various spans, depending upon their position in the root and whether they need to be extended to complement thickness in the airfoil portion 12.

In the exemplary complex geometric composite airfoil, essentially all of the fiber reinforced laminations and inserts are arranged with a fiber orientation sequence of 0 degree, +Φ degree, −Φ degree. The angle Φ is a predetermined angle as measured from the 0° position, the 0° position corresponding to an axis extending generally radially from the centerline of the engine and through the center plane of airfoil, which axis may be its centerline or stacking line, with the fibers running substantially parallel to this axis or at 0° to this axis. The angle Φ is preferably about 45°, which means that fibers in a prepreg layer laid up at an angle Φ of about 45° form an angle of about 45° with this axis, while fibers in a prepreg layer laid up at an angle −Φ of about −45° form an angle of about −45° with this axis, and alternately lie about 90° with the fibers of the prepreg layer laid up at an angle Φ of about 45°.

Figure 2:
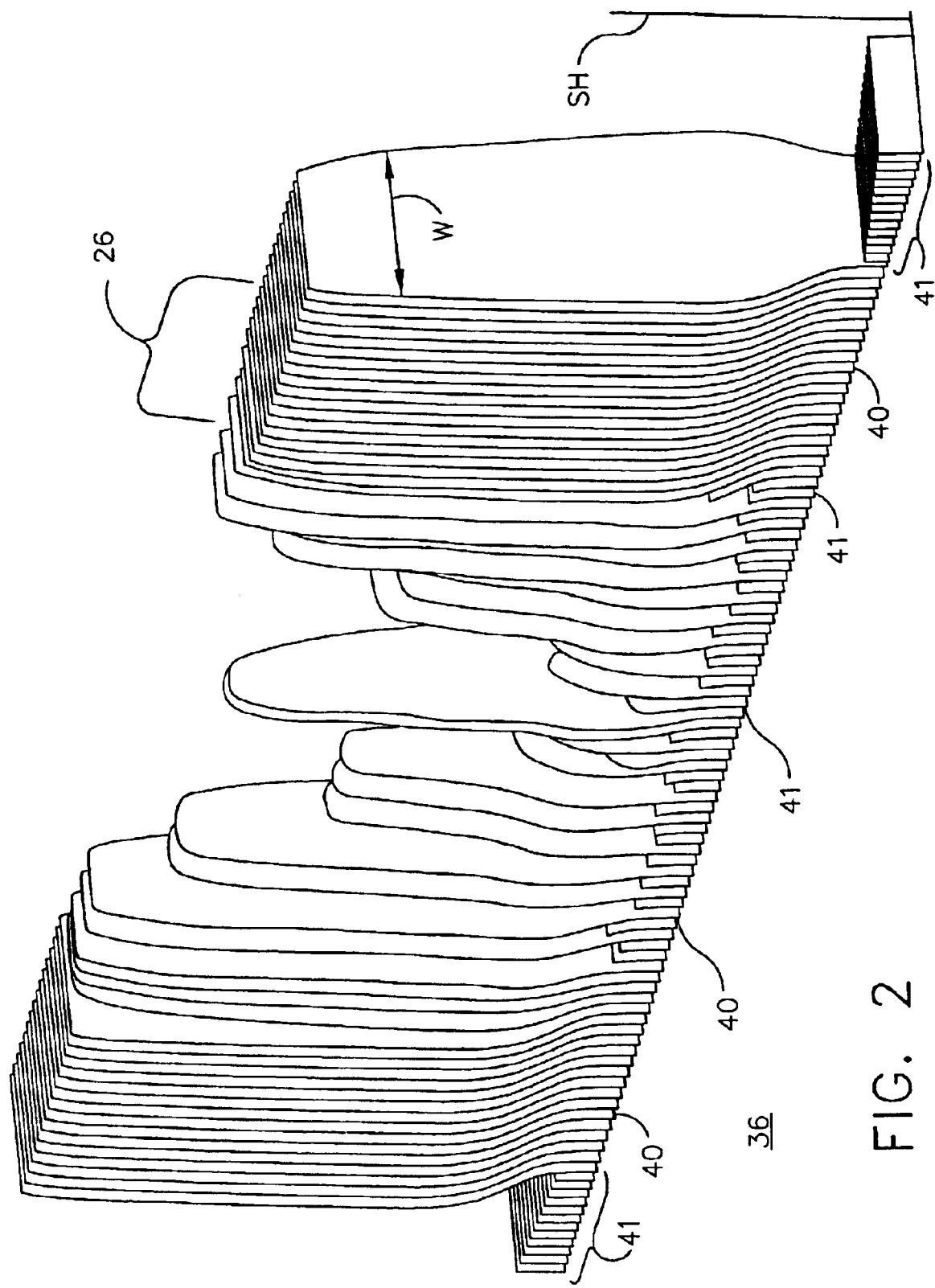
FIG. 2 is an exploded perspective view of a turbofan engine composite fan blade ply lay-up in accordance with one embodiment of the present invention.
Figure 4:
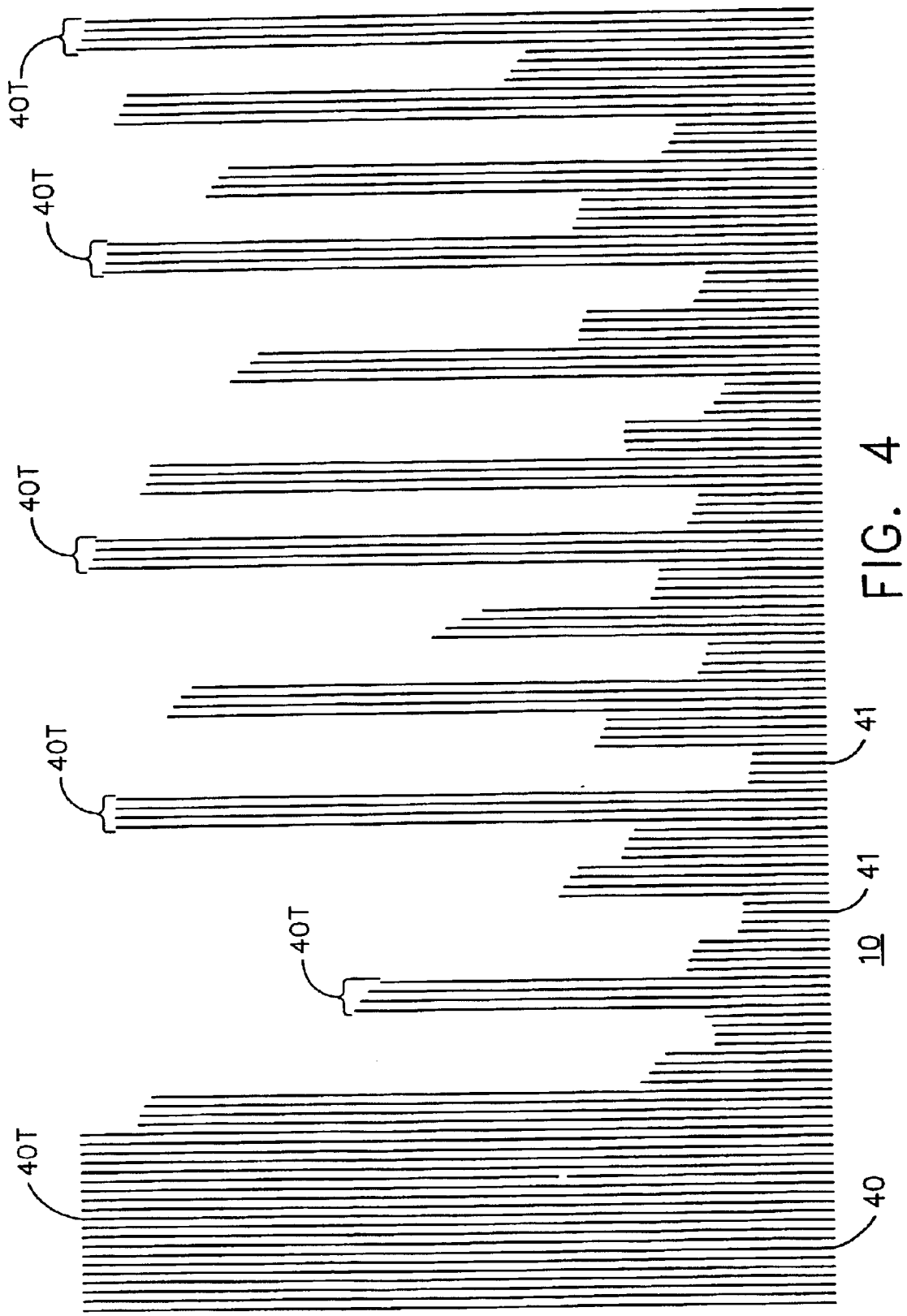
FIG. 4 is a cross-sectional graphical representation of a ply lay-up in accordance with the preferred embodiment of the present invention.

FIG. 4 illustrates a more complicated arrangement of airfoil plies 40 that may be preferred to the embodiment shown in FIG. 2. The arrangement in FIG. 4, as predetermined by the CAD system, utilizes a more random distribution of airfoil plies 40 than that shown in FIG. 2. These groups are arranged in a more random or mixed up manner so fewer adjacent groups are arranged in a sequence by height and that such sequences are interrupted by groups of relatively tall airfoil plies 40T.

Known CAD systems utilize flattening software to convert the complex three dimensional geometric airfoil shape into a two dimensional (2D) pattern. Conventionally, the software transversely slices a preform shape (not shown), from leading edge 16 to trailing edge 18, into many small slices. The number of slices corresponds to the number of airfoil plies or laminations required to form an airfoil 10 and may run on the order of one thousand. Ply thickness is usually determined by the material to be used and is on the order of 4–6 mils. The span height SH, width W, and shape of each individual ply depends, at least in part, on the shape and contour of the blade. As discussed above, the complex geometries of modern airfoils do not allow for a single piece of unidirectional fiber material to be used in certain ply locations. The CAD system, using predetermined criteria, calculates the shape of the sections of an airfoil ply 40, oriented for example at −Φ°, as shown in FIG. 3. To produce sections that can the be laid onto the airfoil-shaped tool surface, the CAD system has divided the individual airfoil ply 40 into a plurality of sections, sections (a)–(g) in FIG. 3 representing the sequence or order in which each ply section of the ply is laid up. The CAD system calculates the number of ply sections and sequence for each ply at each angular orientation of 0°, +Φ°, −Φ° in the ply stacking sequence. The sequencing can be determined automatically or optionally in combination with manual intervention, to calculate the shape of the ply sections 40a–40g to permit unidirectional fiber orientation throughout the blade geometry, and the order in which each ply section 40a–40g is laid up. Although ply 40 of FIG. 3 is represented as divided into sections (a) through (g), it will be understood by those skilled in the art that the number of sections x for each individual ply 40 may be greater or less than the six sections represented by 40(a) through 40(g) in FIG. 3. It will also be understood that the lay-up sequence may be such that 40(b) may not be laid up sequentially adjacent to 40(a) and 40(c) as shown in FIG. 3.

Prepreg plies 40, 41 are formed from, for example, prepreg unidirectional graphite fabric material. The airfoil plies 40 are laid up in, for example, at 0°, +Φ°, −Φ° ply stacking sequence, as discussed above. The prepreg plies 40, 41 of composite material are laid into the lay-up tool 420 of FIG. 5 sequentially as determined by the CAD program. The 0°, +Φ°, −Φ° ply orientation is predetermined by the CAD program from the piece previously laid into the lay-up tool 420. To avoid formation of a shear plane created by stacking ply sections 40 of substantially identical length, the CAD system is programmed to "shuffle" the ply section lay-up progression from the order in which the "cuts" are made so that the end of a ply section 40 does not stack directly upon the end of its immediate predecessor in the stack. However, the present invention will operate equally well on non-shuffled ply section lay-up progressions.

Figure 5:
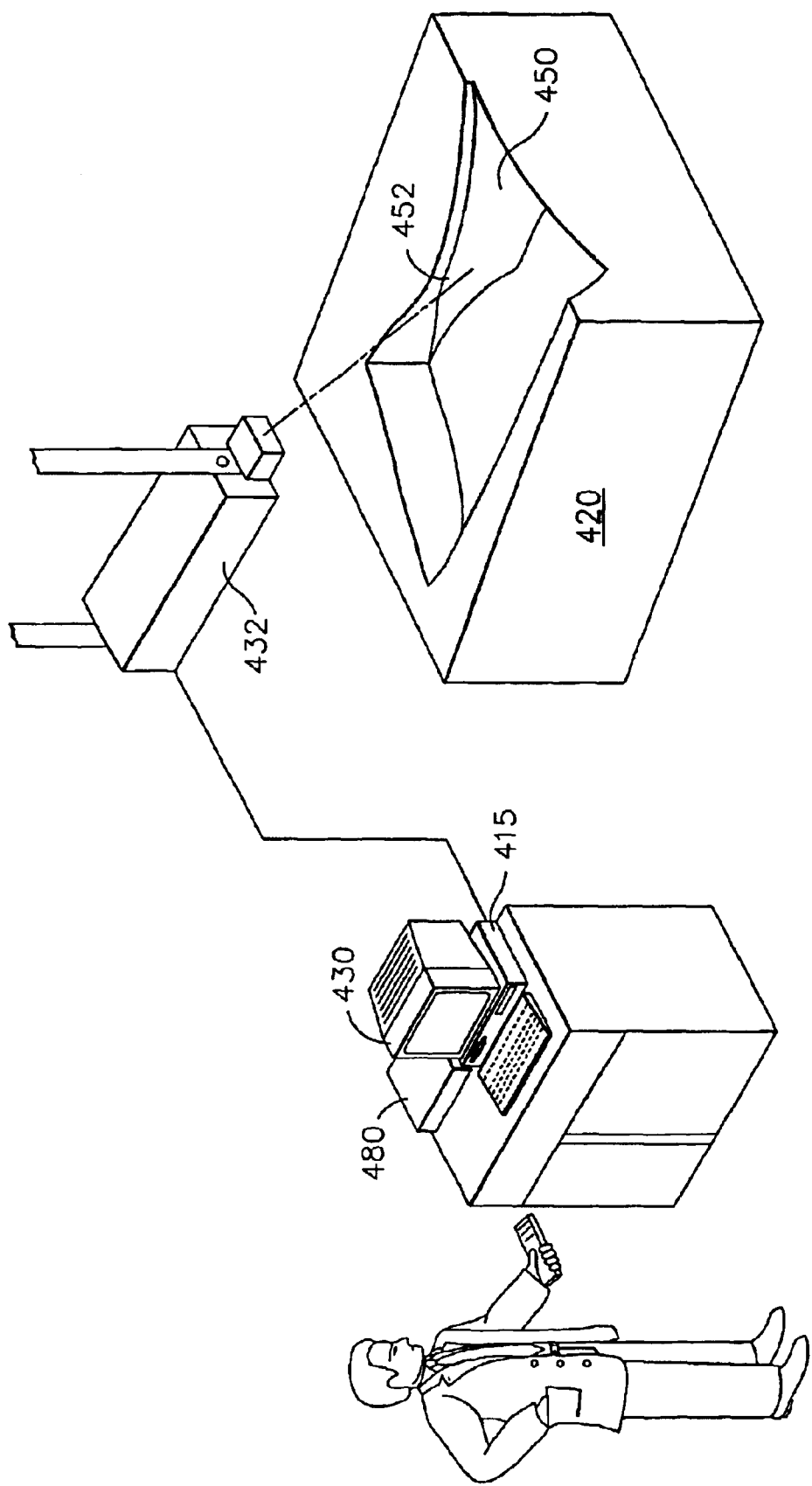
FIG. 5 is a perspective view of the lamination apparatus for use with the preferred embodiment of the present invention.

Referring to FIG. 5, the "shuffled" ply section lay-up progression sequence, individual ply section boundary 452, fiber direction and target point 450 for each ply section, as determined by the CAD system is loaded into the OLT 430. The target point 450, defined to be the starting point for laying the ply section 40 to, for example, lay-up tool 420 or a previous laid-up ply section, is the first contact point ply section 40 has with the work surface, for example, the lay-up tool 420, a previously assembled ply section or insert 41. Each ply section target point 450 is calculated to be coincident with the starting point to convert the 3D shape into 2D ply section patterns, as determined by the CAD system flattening software. Each ply section 40(x) is assembled onto the tool so that the starting point of the ply section contacts the ply section target point illuminated by laser 432 as, for example, a cross-hair target. The laser 432 also rapidly outlines the profile of ply section 40y, where 40y represents a ply section at position y in the sequence of ply sections 40x where x is the number of sections required to form the airfoil ply. The rapid outlining of the profile of ply section 40y permits the operator to properly orient the ply section 40y before placing it onto lay-up tool 420. It is important that the plies be properly oriented. This permits the ply section to mate up with the tool and with any other previously laid up plies 40(y−1) and minimizes the need to stretch the ply section at angles to unidirectional fibers in order to obtain a continuous lay-up of ply sections 40x in any airfoil ply 40. The proper lay-up of the ply sections also minimizes or eliminates the need to trim excess prepreg material from a blade once the plies are assembled and debulked, as improperly placed plies will protrude from the profile of the blade. If a ply section is not laid up within the profile outline scanned by the laser 432, it must be repositioned within the profile outline. Because of the tacky nature of prepreg material, to reposition a ply section 43x, it must be physically lifted from the substrate, which may be either lay-up tool 432 or a previously laid up ply, as the prepreg ply section cannot readily be rotated into the proper orientation. It is possible to stretch the prepreg ply section in directions that are not parallel to the direction of unidirectional fiber, but this is not desirable. The use of the laser to project both the boundary of the individual ply section 452 and the target point 450 for lay-up of the ply section simultaneously allows the lay-up of the ply sections into the tool 420 to best match the CAD system design in flattening the 3D shape into a planar 2D pattern, This allow for repeatability, better accuracy and better quality.

The composite blade 10 manufacturing process begins with the cutting of material into the proper ply section 40a–40g shapes which when positioned properly in the tooling 420, using the method of the present invention, will compact under heat and pressure to produce a composite blade 10 in accordance with the embodiments of the present invention as described above.

The preferred cutting method features an automated cutting of ply sections. The 2D ply section shape data determined by the CAD system is used to drive, for example, an ultrasonic knife on a gantry above the unidirectional fiber ply material laid out on a cutting table. The knife is directed to follow the data and cut the material laid out on the table into the unidirectional fiber ply sections compiled into the CAD system determined sequence for lay-up. An alternate cutting method employs steel rule die boards to cut the plies.

The CAD system may recall from memory the shape of a ply or ply section that is to be assembled in the sequence, and the ply or ply sections may be cut in accordance with the stored algorithm corresponding to the shape. The ply or ply sections may then be laid up or assembled into a kit. Of course, the kit can be preassembled in anticipation of subsequent lay up and stored for later assembly. Plies can be cut and preassembled in any known manner.

When the blade is ready for assembly, the CAD system is activated for the particular blade design and the data set corresponding to the blade design stored in storage medium is loaded into memory of the CAD system. The CAD system 410 then provides an instruction to the OLT system 430 corresponding to a first ply configuration and location. The CAD system 410 can interact with a computing device 415 which computing device 415 also interacts with OLT 430. In addition to control functions, OLT system 430 includes at least one laser 432. The instruction received by the OLT system causes laser 432 to illuminate a target point 452 for the start of lay-up of the ply section, that is the point for initial placement of the ply section, where the ply section first makes contact with the previous layer or the lay-up tool 420, the outline of the boundary of the ply section on lay-up tool 420 and the ply section reference number. The ply can be positioned against the lay-up tool 420 so that the first ply contacts target point 452, and ideally so that the ply edges mates with the ply boundary outline projected by the laser. After a ply section has been laid up, the process of projecting a target point and image of the ply section outline onto the lay-up tool or onto plies already assembled into lay-up tool 420 can then be repeated for each individual ply section until the entire ply is assembled. Then, the next ply can be assembled in a similar fashion until the entire blade is assembled.

Next, the ply sections 40a–40g can be assembled according to the arrangement described herein to achieve a unidirectional fiber reinforced lamination composite blade 10 described previously. In this circumstance, the instruction sent to the OLT 430, either from the computer 415 or from CAD system 410, is for location and placement of each individual ply section 40a–40g into the appropriate position onto the lay-up tool and previously assembled plies. Because of the tacky nature of the prepreg material, each ply section will adhere to the underlying, preassembled plies. The blade plies 40 and inserts 41 are intermingled or mixed up in accordance with the predetermined manner set forth by CAD system as described above. This mixing of the lay-up sequence of the plies leads to what is called a confused shear plane lay-up. For example, the blade lay-up may be a standard quasi-isotropic lay-up of $((0°, +45°, 0°, -45°)_n)_s$. However, it should be appreciated that the present invention allows for any lay up sequence programmable into the OLT, so that the sequence is not restricted to one generated by CAD system 410.

The airfoil, according to the present invention, is preferably assembled (preformed) in the tool from one side continuously through to the other side. This ensures a good match between the airfoil plies at the centerplane and helps prevent wrinkling in the airfoil. The material has a bulk factor which affects the lay-up and position of the plies during the preforming operation. To reduce the bulk factor of the material and eliminate some internal wrinkling, preferably, hot debulks are performed during the lay-up of the airfoil, followed by the final cure. Both are well know in the art and will not be described herein.

While the preferred embodiment of the present invention has been described fully in order to explain its principles, it is understood that various modifications or alterations may be made to the preferred embodiment without departing from the scope of the invention as set forth in the appended claims.

What is claimed is:

1. A lamination apparatus for use in making a composite laminate article comprising:
    a work surface for receiving, in a predetermined sequence, a plurality of plies of composite laminating material;
    a laser projection system using predetermined projection points for outlining the boundaries of a ply onto the work surface, the image farther indicating at least a ply target point for making first contact of the ply with the underlying work surface; and
    a data set corresponding to each ply image in a sequence of ply images forming the composite article, for providing sequentially the predetermined projection points of each ply to the laser projection system, wherein the data set is formulated by a CAD system using predetermined design criteria to convert each ply in the plurality of plies forming the article and having a 3D geometric shape into a plurality of 2D ply segments arranged in a sequential pattern so that the assembled 2D ply segments approximate the 3D geometric shape.

2. The apparatus of claim 1 wherein the data set is formulated so that the assembled 2D ply segments maintain unidirectional fiber orientation within a ply.

3. The apparatus of claim 1 wherein a ply target point on the work surface is coincident with a CAD system starting point that arranges the plurality of 2D ply segments assembled in a sequential pattern into the 3D ply geometric shape.

4. A process for laying up a composite laminate article comprising:
    (a) providing a data set indicative of a plurality of images, each preselected ply image corresponding to a preselected location of the article;
    (b) converting, using predetermined design criteria, the data set indicative of a preselected ply image from a 3D geometric ply shape into a data set indicative of a plurality of 2D plies of preselected section patterns;
    (c) providing a plurality of data sets for predetermined ply section patterns, each data set indicative of a plurality of unidirectional prepreg ply segment images, and a sequence, including ply segment orientation, for assembling the plurality of prepreg ply segments images into a predetermined ply section pattern;
    (d) providing a plurality of unidirectional prepreg ply segments, each ply segment corresponding to one of the plurality of prepreg ply segment images;
    (e) projecting an outline of a boundary of a predetermined ply section pattern image at the preselected location onto a work surface in accordance with the assembly sequence, the outline including at least a first target point;

(e) selecting a ply segment from the plurality of prepreg ply segments corresponding to the predetermined ply outline at the preselected location;

(f) laying up the ply segment so that the ply segment contacts the work surface at the at least first target point and along the outline of the boundary of the predetermined image;

(g) repeating steps (a)–(f) until the plurality of prepreg ply segments are laid up as the predetermined ply section pattern;

(h) providing a unidirectional prepreg ply, the ply corresponding to one of the plurality of prepreg ply images;

(i) laying up the ply so that it contacts the at least first target point and along the boundary of the projected ply section on the work surface; and (j) repeating steps (a)–(j) until the plurality of prepreg plies are assembled as a composite laminate.

5. The process of claim 4 wherein the step of providing a data set indicative of the preselected image further includes a ply sequence identifier.

6. The process of claim 4 wherein the step of converting the data set indicative of a preselected ply image from a 3D geometric ply shape into a data set indicative of a plurality of 2D ply section patterns includes converting a data set formulated by a CAD system using predetermined design criteria to represent a 3D geometric ply shape into a data set representative of a plurality of 2D ply section patterns so that ply segments corresponding to 2D ply section patterns approximate the 3D ply shape when corresponding ply segments are assembled in accordance with the assembly sequence while maintaining unidirectional fiber orientation.

7. The process of claim 6 wherein the step of providing a data set indicative of a preselected ply image includes providing a preselected image having at least a first target point coincident with a starting point determined by the CAD system for initial placement of the ply section.

8. The process of claim 4 further comprising the step of compacting the assembly of the plurality of prepreg ply segments under predetermined heat and pressure to debulk and cure the composite laminate article.

9. The process of claim 4 further includes forming a composite laminate article having a sequence of plies laid up to have a confused shear plane, each ply formed from at least one ply.

10. The process of claim 9 wherein the angular orientation of each successive ply in the sequence of plies having the confused shear plane quasi-isotropic lay-up is $((0°, +\Phi°, 0°, -\Phi°)_n)_s$.

11. The process of claim 10 wherein the angle $\Phi$ is about 45°.

12. The process of claim 4 further including the step of laying up the composite laminate article by laying up a ply from ply segments starting from a first side continuously and sequentially through to a second side.

13. The composite laminate article produced by the process of claim 4.

14. The composite laminate article of claim 13 wherein the composite laminate article comprises an airfoil.

* * * * *

UNITED STATES PATENT AND TRADEMARK OFFICE
CERTIFICATE OF CORRECTION

PATENT NO.   : 6,843,565 B2
DATED        : January 18, 2005
INVENTOR(S)  : Evans et al.

It is certified that error appears in the above-identified patent and that said Letters Patent is hereby corrected as shown below:

Column 2,
Line 11, "+Φ, 0º"" should be -- +Φº, 0º --.

Column 8,
Line 24, "farther" should be -- further --.

Signed and Sealed this

Seventh Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,843,565 B2
DATED : January 18, 2005
INVENTOR(S) : Evans et al.

It is certified that error appears in the above-identified patent and that said Letters Patent is hereby corrected as shown below:

Column 2,
Lines 52 and 56, "hand-lay-up" should be -- hand lay-up --.

Column 6,
Line 62, "pattern, This" should be -- pattern. This --.
Line 62, "allow" should be -- allows --.

Column 8,
Line 8, "know" should be -- known --.

Signed and Sealed this

Twenty-first Day of March, 2006

JON W. DUDAS
*Director of the United States Patent and Trademark Office*